(12) United States Patent
Tadokoro (10) Patent No.: US 10,775,161 B2
(45) Date of Patent: Sep. 15, 2020

(54) ROLL OBJECT INSPECTION APPARATUS

(71) Applicant: KONICA MINOLTA, INC., Chiyoda-ku, Tokyo (JP)

(72) Inventor: Akinori Tadokoro, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 276 days.

(21) Appl. No.: 15/968,848

(22) Filed: May 2, 2018

(65) Prior Publication Data

US 2018/0347972 A1 Dec. 6, 2018

(30) Foreign Application Priority Data

Jun. 2, 2017 (JP) ................. 2017-110403

(51) Int. Cl.
| | |
|---|---|
| *H04N 5/225* | (2006.01) |
| *H04N 5/232* | (2006.01) |
| *G01B 11/30* | (2006.01) |
| *G01C 3/08* | (2006.01) |
| *G01S 17/88* | (2006.01) |
| *G01N 21/952* | (2006.01) |
| *G03G 15/00* | (2006.01) |
| *G01S 17/08* | (2006.01) |
| *G06T 7/00* | (2017.01) |
| *G03G 15/16* | (2006.01) |

(Continued)

(52) U.S. Cl.
CPC .............. *G01B 11/303* (2013.01); *G01C 3/08* (2013.01); *G01N 21/952* (2013.01); *G01S 17/88* (2013.01); *H04N 5/2256* (2013.01); *H04N 5/23229* (2013.01); *H04N 5/23296* (2013.01); *G01N 2201/101* (2013.01); *G01S 17/08* (2013.01); *G01S 17/36* (2013.01); *G01S 17/48* (2013.01); *G03G 15/1615* (2013.01); *G03G 15/75* (2013.01); *G06T 7/0008* (2013.01); *G06T 2207/30164* (2013.01)

(58) Field of Classification Search
CPC ......... G01B 11/303; G01C 3/08; G01S 17/08; G01S 17/36; G01S 17/48; G01S 17/88; G03G 15/1615; G03G 15/75; G06T 2207/30164; G06T 7/0008; H04N 5/2256; H04N 5/23296; H04N 5/23229; G01N 21/952; G01N 2201/101
USPC ............................................ 348/88
See application file for complete search history.

(56) References Cited

U.S. PATENT DOCUMENTS

| | | | | |
|---|---|---|---|---|
| 4,841,364 A | * | 6/1989 | Kosaka | ............... B29C 45/7626 |
| | | | | 348/128 |
| 6,674,523 B2 | * | 1/2004 | Kawamorita | ........ G01N 27/205 |
| | | | | 356/237.1 |

(Continued)

FOREIGN PATENT DOCUMENTS

| | | | | |
|---|---|---|---|---|
| JP | 03291552 A | * | 12/1991 | |
| JP | 06214404 A | * | 8/1994 | |

(Continued)

*Primary Examiner* — Christopher S Kelley
*Assistant Examiner* — Kathleen M Walsh
(74) *Attorney, Agent, or Firm* — Buchanan Ingersoll & Rooney PC (57) ABSTRACT

A roll object inspection apparatus includes a shooting part that shoots a surface of a roll molded body which is the uncut roll object and is injection-molded and then continuously fed in a predetermined feeding direction.

16 Claims, 11 Drawing Sheets

(51) Int. Cl.
 G01S 17/36 (2006.01)
 G01S 17/48 (2006.01)

(56) References Cited

U.S. PATENT DOCUMENTS

| | | | | |
|---|---|---|---|---|
| 2010/0328524 | A1* | 12/2010 | Yoshizumi | H04N 5/232 |
| | | | | 348/373 |
| 2011/0069323 | A1* | 3/2011 | Takahashi | G06T 7/521 |
| | | | | 356/625 |
| 2013/0128026 | A1* | 5/2013 | Hirose | G06T 7/0004 |
| | | | | 348/125 |
| 2015/0192529 | A1* | 7/2015 | Sato | G01N 21/88 |
| | | | | 438/16 |
| 2017/0045877 | A1* | 2/2017 | Shapiro | B23K 37/0408 |
| 2017/0266853 | A1* | 9/2017 | Shimada | B30B 11/005 |
| 2018/0213134 | A1* | 7/2018 | Wu | G06T 7/0004 |

FOREIGN PATENT DOCUMENTS

| | | | | |
|---|---|---|---|---|
| JP | 07152160 | A | * | 6/1995 |
| JP | 08147467 | A | * | 6/1996 |
| JP | 08304291 | A | * | 11/1996 |
| JP | 2006258519 | A | * | 9/2006 |
| JP | 2009069131 | A | * | 4/2009 |
| JP | 2012-078728 | A | | 4/2012 |
| JP | 2016102878 | A | * | 6/2016 |

\* cited by examiner

ROLL OBJECT INSPECTION APPARATUS

The entire disclosure of Japanese patent Application No. 2017-110403, filed on Jun. 2, 2017, is incorporated herein by reference in its entirety.

BACKGROUND

Technological Field

The present invention relates to a roll object inspection apparatus. More specifically, the present invention relates to a roll object inspection apparatus capable of reducing a time to detect the presence of a defect.

Description of the Related Art

Image forming apparatuses in an electrophotographic system include multi function peripherals (M P) including a scanner function, a facsimile function, a copy function, a printer function, a data communication function, and a server function, facsimiles, copying machines, printers, and the like.

An image forming apparatus is generally configured such that an electrostatic latent image formed on an image carrier is developed by a development device thereby to form a toner image, the toner image is transferred onto a sheet, and the toner image is then fixed on the sheet by a fixing device thereby to form an image on the sheet. Further, some image forming apparatuses are configured such that an electrostatic latent image on the surface of a photosensitive body is developed by a development device thereby to form a toner image, the toner image is transferred onto an intermediate transfer belt by use of a primary transfer roller, and the toner image on the intermediate transfer belt is secondarily transferred onto a sheet by use of a secondary transfer roller.

Generally, an intermediate transfer belt is manufactured in the following method. A thermoplastic resin-containing material is prepared and the thermoplastic resin in the material is melted. The material containing the melted thermoplastic resin is injection-molded in a roll shape by use of a mold. The resultant molded body by injection molding is cooled while being fed, and is cut into a predetermined length thereby to obtain a roll object. The shape of the roll object is corrected and the corrected roll object is further cut into the length of an intermediate transfer belt. Thereafter, the presence of a defect on the surface of the intermediate transfer belt is inspected in an inspection step.

JP 2012-078728 A and the like disclose a conventional technique of an electrophotographic sensitive body manufacturing method. JP 2012-078728 A discloses an electrophotographic sensitive body manufacturing method including a cleansing step of immersing a roll base into a cleansing liquid at a higher temperature than the outside temperature thereby to cleanse the roll base, a foreign object detection step of detecting a foreign object attached on the surface, and a photosensitive layer forming step of forming a photosensitive layer on the roll base.

A defect on the surface of an intermediate transfer belt is caused mainly during injection molding. A conventional step of manufacturing an intermediate transfer belt employs an offline system for inspecting the presence of a defect on the surface of an intermediate transfer belt after cutting a molded body. Thus, a defect cannot be detected until the shape of the molded body is corrected and cut into a length of the intermediate transfer belt. Further, the intermediate transfer belt needs to be attached on an inspection machine when inspected, which takes much time. Consequently, it takes a long time to detect the presence of a defect.

The problem that it takes a long time to detect the presence of a defect can be caused not only in an intermediate transfer belt to be inspected but also in general roll objects manufactured by injection molding.

SUMMARY

The present invention is directed for solving the above problem, and an object thereof is to provide a roll object inspection apparatus capable of reducing a time to detect the presence of a defect.

To achieve the abovementioned object, according to an aspect of the present invention, a roll object inspection apparatus reflecting one aspect of the present invention comprises: a shooting part that shoots a surface of a roll molded body which is the uncut roll object and is injection-molded and then continuously fed in a predetermined feeding direction.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

The following embodiment will be described assuming that a roll object to be inspected by an inspection apparatus is an intermediate transfer belt. The roll objects to be inspected by the inspection apparatus according to an embodiment of the present invention may be any roll objects such as photosensitive body and fixing belt in addition to intermediate transfer belt.

Figure 1:
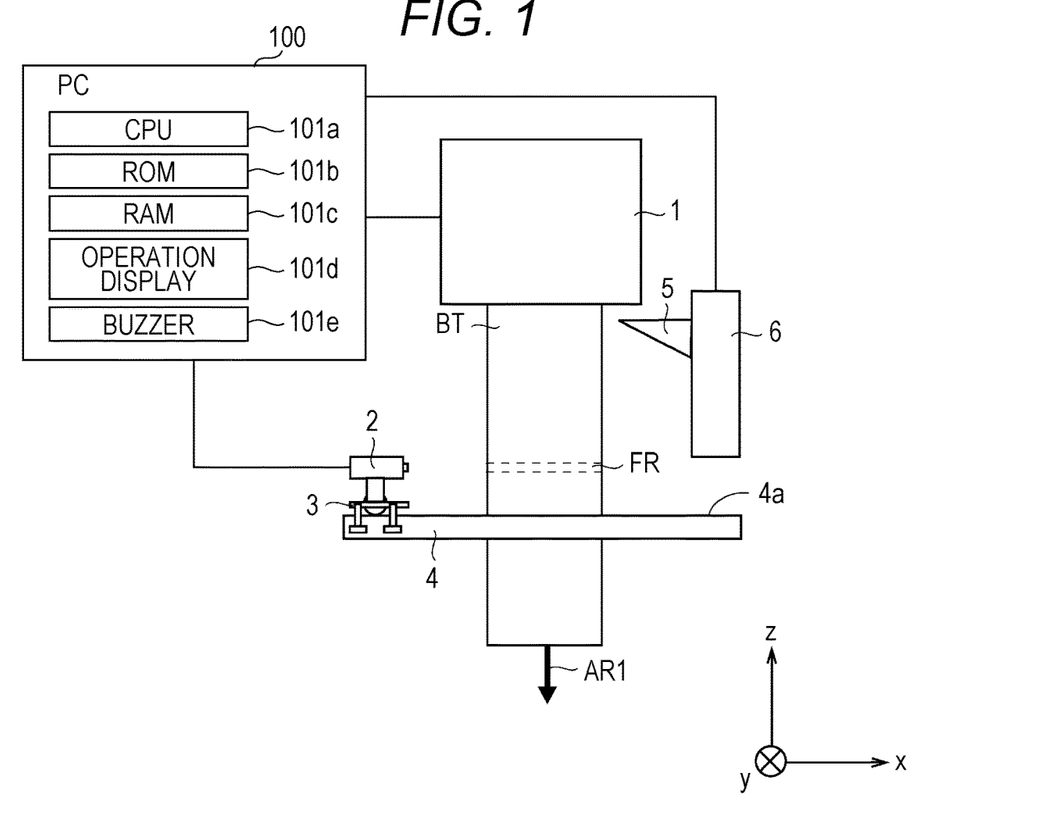
FIG. 1 is a front view illustrating a configuration of an intermediate transfer belt manufacturing apparatus according to an embodiment of the present invention.
Figure 2:
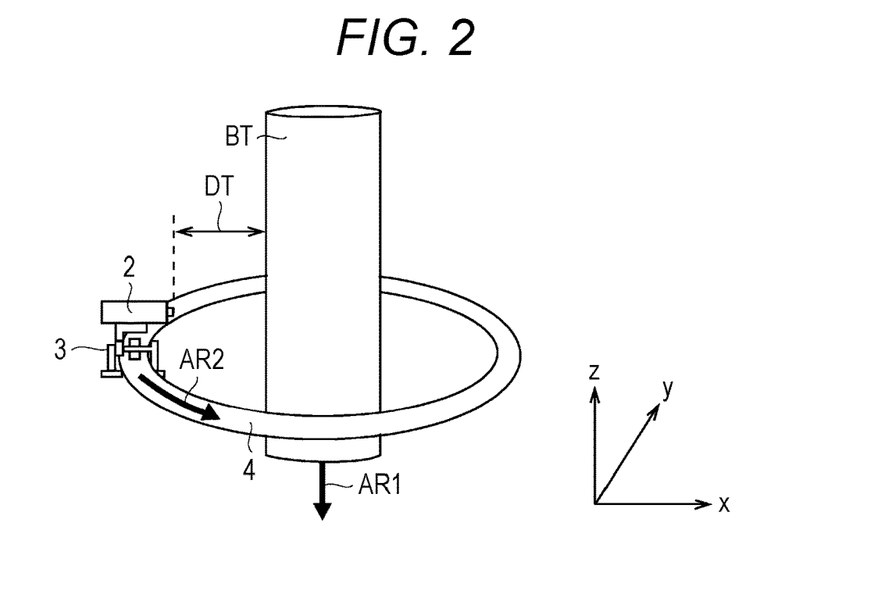
FIG. 2 is a perspective view illustrating a configuration of part of the intermediate transfer belt manufacturing apparatus according to an embodiment of the present invention.

FIG. 1 is a font view illustrating a configuration of an intermediate transfer belt manufacturing apparatus according to an embodiment of the present invention. FIG. 2 is a perspective view illustrating a configuration of part of the intermediate transfer belt manufacturing apparatus according to an embodiment of the present invention. In the drawings, a direction along a molded body feeding direction AR1 is assumed as z-axis direction, and directions in a plane in which a shooting part 2 and a movement part 3 move are assumed as x-axis direction and y-axis direction, respectively. The x-axis direction, the y-axis direction, and the z-axis direction are orthogonal to each other.

With reference to FIG. 1 and FIG. 2, the intermediate transfer belt manufacturing apparatus (exemplary roll object inspection apparatus) according to the present embodiment is directed for manufacturing an intermediate transfer belt as a member of an image forming apparatus, onto which a toner image formed on a photosensitive body is primarily transferred and which secondarily transfers the transferred toner image onto a sheet. The intermediate transfer belt manufacturing apparatus includes an injection molding machine 1, the shooting part 2, the movement part 3, a pedestal 4, a cutter 5, a cutter driver 6, and a personal computer (PC) 100.

The injection molding machine 1 injection-molds a roll (preferably cylindrical) molded body, and continuously feeds the injection-molded body BT in the feeding direction AR1. Here, the feeding direction AR1 is a vertically-downward direction. The injection molding machine 1 includes a hopper, a heating cylinder, a screw, a die, a cooler, and a tensile machine. The hopper is directed for introducing a thermoplastic resin-containing material into an internal space of the heating cylinder. The heating cylinder heats the material in the internal space by a heater. The screw mixes the material in the internal space of the heating cylinder, and carries the mixed material toward the die. The die is provided on the downstream of the heating cylinder, and molds the material into a required shape (roll shape here). The cooler cools the injected molded body. The tensile machine feeds the molded body BT cooled by the cooler in the feeding direction AR1.

The shooting part 2 shoots the surface of a roll molded body BT which is to be cut by the cutter 5 and is continuously fed out of the injection molding machine 1 after injection-molded. The shooting part 2 is fixed on the movement part 3, and moves together with the movement part 3. The shooting part 2 is arranged above the pedestal 4.

The movement part 3 is movably engaged with the pedestal 4. The movement part 3 moves along the pedestal 4 as indicated in an arrow AR2.

The pedestal 4 has an annular shape (preferably circular planner shape) surrounding the outer periphery of the molded body BT. The pedestal 4 functions as a rail when the movement part 3 moves. The pedestal 4 preferably includes, as a travelling face in which the movement part 3 moves (travels), a top face 4a as a plane (horizontal plane) orthogonal to the feeding direction AR1 of the molded body BT. Thereby, the shooting part 2 and the movement part 3 can move around the molded body BT in the plane (in the horizontal plane here) orthogonal to the feeding direction of the molded body BT. Further, the shooting part 2 shoots the surface of the molded body BT while rotating around the molded body BT, thereby shooting the surface of the molded body BT in a shooting region FR along the entire periphery of the molded body BT fed in the feeding direction AR1.

The methods for shooting the surface of the molded body BT along the entire periphery may be a first method for rotating the shooting part 2 and keeping the injection molding machine 1 and the molded body BT still as described above, and a second method for keeping the shooting part 2 still and rotating the injection molding machine 1 and the molded body BT. According to the first method, a situation that vibrations caused when the injection molding machine 1 is rotated adversely affect the quality of the molded body BT can be avoided, thereby preventing a reduction in the quality of the molded body. Additionally, according to the first method, the surface of the molded body BT along the entire periphery can be rapidly shot even when the shooting part 2 includes only one camera.

The cutter 5 cuts the molded body BT in the plane with the feeding direction AR1 as a normal line thereby to separate an intermediate transfer belt from the molded body BT. The cutter 5 may cut the molded body BT at a cutting position on the upstream of the shooting region FR in the feeding direction AR1 as in the present embodiment, and may cut the molded body BT at a cutting position on the downstream of the shooting region FR in the feeding direction AR1.

The cutter driver 6 drives the cutter 5. The cutter driver 6 brings the cutter 5 into contact with the molded body BT from the outer diameter side of the molded body BT while rotating a rotary blade of the cutter 5. Thereby the cutter 5 cuts the molded body BT.

The PC 100 is an image processing computer, and is connected to the injection molding machine 1, the shooting part 2, the movement part 3, and the cutter driver 6. The PC 100 includes a central processing unit (CPU) 101$a$, a read only memory (ROM) 101$b$, a random access memory (RAM) 101$c$, an operation display 101$d$ (examples of first and second alarms, threshold setter, and detection result notifier), and a buzzer 101e. The CPU 101a is mutually connected to the ROM 101b, the RAM 101c, the operation display 101d, and the buzzer 101e.

The CPU 101a controls the entire intermediate transfer belt manufacturing apparatus. Further, the CPU 101a executes control programs stored in the ROM 101b.

The ROM 101b is a flash ROM, for example. The ROM 101b stores various control programs and various items of fixed data.

The RAM 101c is a main memory of the CPU 101a. The RAM 101c is used to temporarily store data required by the CPU 101a for executing the control programs, or image data.

The operation display 101d receives various operations. Further, the operation display 101d displays various items of information.

The buzzer 101e issues sound under control of the CPU 101a.

Figure 3:
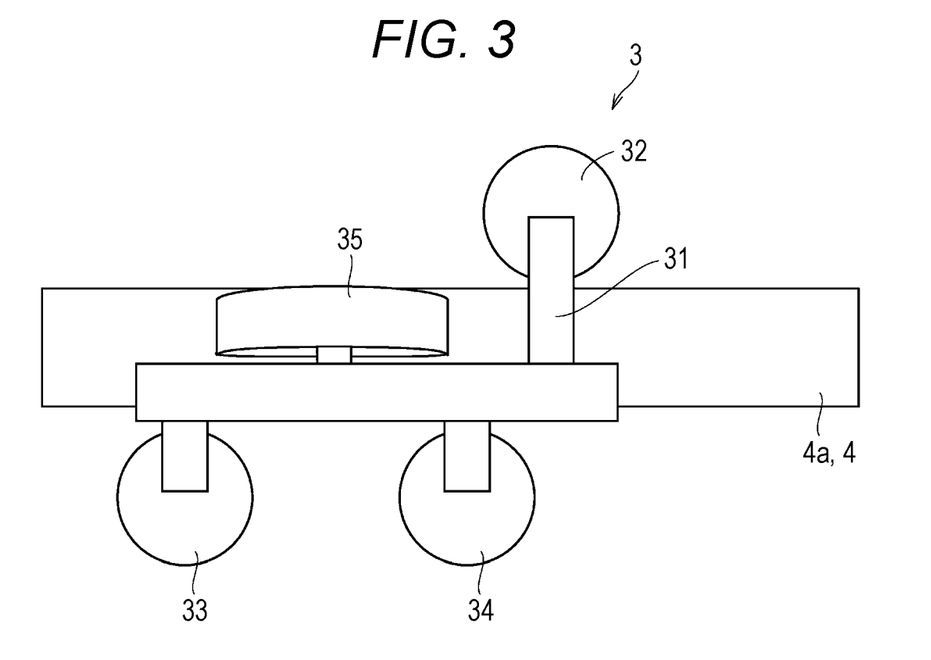
FIG. 3 is a top view illustrating a configuration of a movement part according to an embodiment of the present invention.
Figure 4:
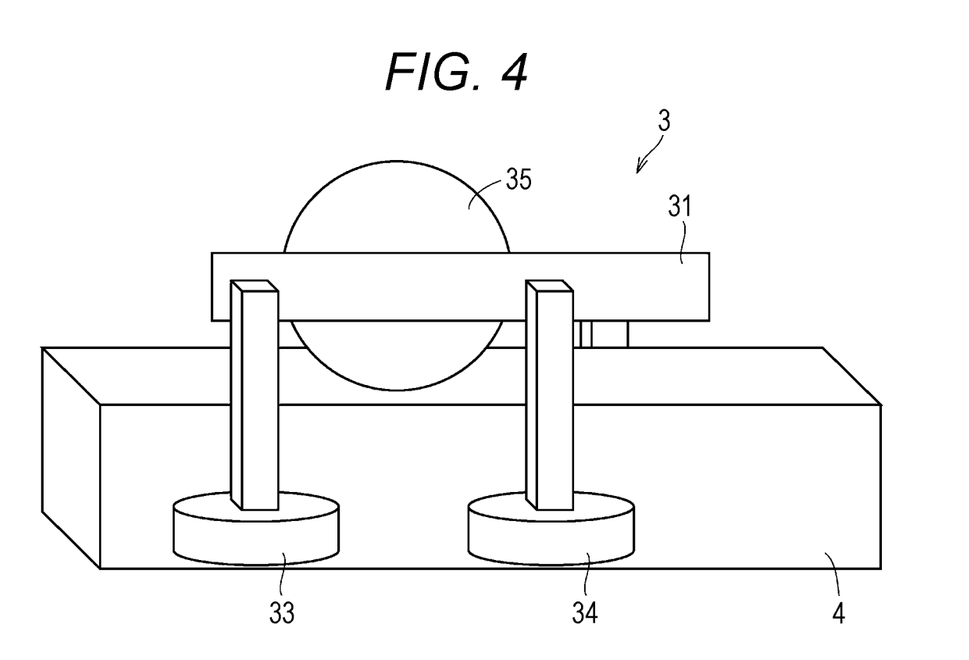
FIG. 4 is a front perspective view illustrating the configuration of the movement part according to an embodiment of the present invention.

FIG. 3 and FIG. 4 are diagrams illustrating a configuration of the movement part 3 according to an embodiment of the present invention. FIG. 3 is a top view and FIG. 4 is a front perspective view.

With reference to FIG. 3 and FIG. 4, the movement part 3 includes a frame 31 and wheels 32 to 35. The frame 31 rotatably supports each of the wheels 32 to 35. Further, the shooting part 2 is fixed on the frame 31. The wheel 32 (exemplary first wheel) travels on the inner diameter side of the pedestal 4. The wheels 33 and 34 (exemplary first wheels) are arranged along the pedestal 4, and travels on the outer diameter side of the pedestal 4. The wheel 35 (exemplary second wheel) travels on the top face 4a of the pedestal 4. The wheel 35 is a driven wheel (travelling wheel) driven by a movement part controller 104 described below. The wheels 32 to 34 are non-driven wheels that freely rotate by a frictional force against the pedestal 4. Further, the wheels 32 to 34 serve (as a role of stabilizing wheels) to stabilize the position of the movement part 3 by sandwiching the pedestal 4 between both sides.

Figure 5:
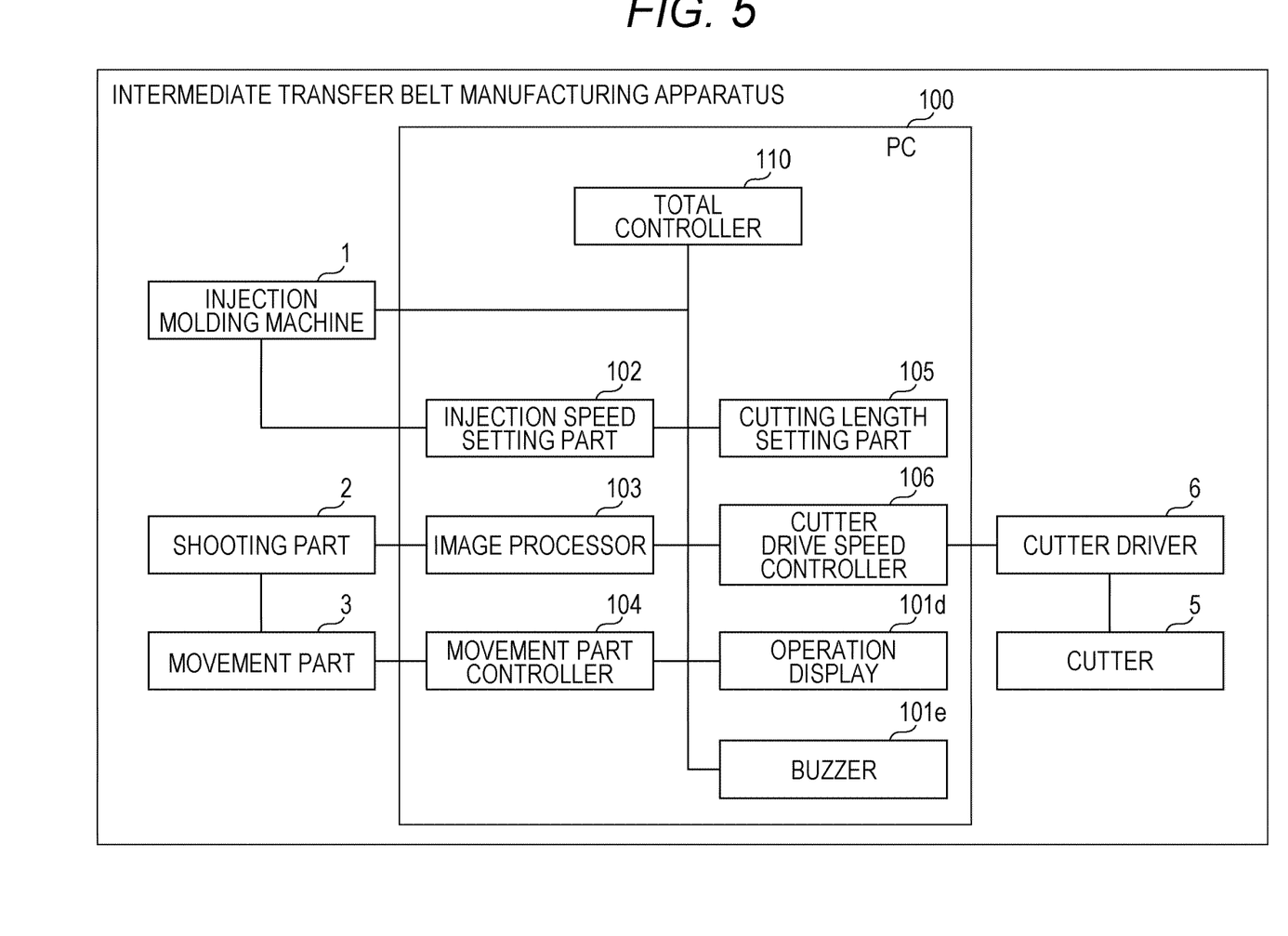
FIG. 5 is a block diagram illustrating a functional configuration of the intermediate transfer belt manufacturing apparatus according to an embodiment of the present invention.

FIG. 5 is a block diagram illustrating a functional configuration of the intermediate transfer belt manufacturing apparatus according to an embodiment of the present invention.

With reference to FIG. 5, the intermediate transfer belt manufacturing apparatus according to the present embodiment includes a total controller 110, an injection speed setting part 102, an image processing unit 103 (examples of an image processor, a defect detector, and a determiner), the movement part controller 104, a cutting length setting part 105, and a cutter drive speed controller 106. The function of each of the total controller 110, the injection speed setting part 102, the image processing unit 103, the movement part controller 104, the cutting length setting part 105, and the cutter drive speed controller 106 is realized by the PC 100.

The total controller 110 controls the entire intermediate transfer belt manufacturing apparatus.

The injection speed setting part 102 sets an injection speed of the injection molding machine 1 (a feeding speed of the molded body BT) on the basis of a setting value received via the operation display 101d.

The image processing unit 103 processes an image shot by the shooting part 2. The image processing unit 103 detects a defect on the basis of the image shot by the shooting part 2 (determines the presence of a defect on the surface of the molded body BT).

The movement part controller 104 controls movement of the movement part 3.

The cutting length setting part 105 sets a length of an intermediate transfer belt cut by the cutter 5 on the basis of the setting value received via the operation display 101d.

The cutter drive speed controller 106 sets a drive speed of the cutter 5 (a rotation speed of the rotary blade of the cutter 5 here) by the cutter driver 6 on the basis of the setting value received via the operation display 101d.

Figure 6:
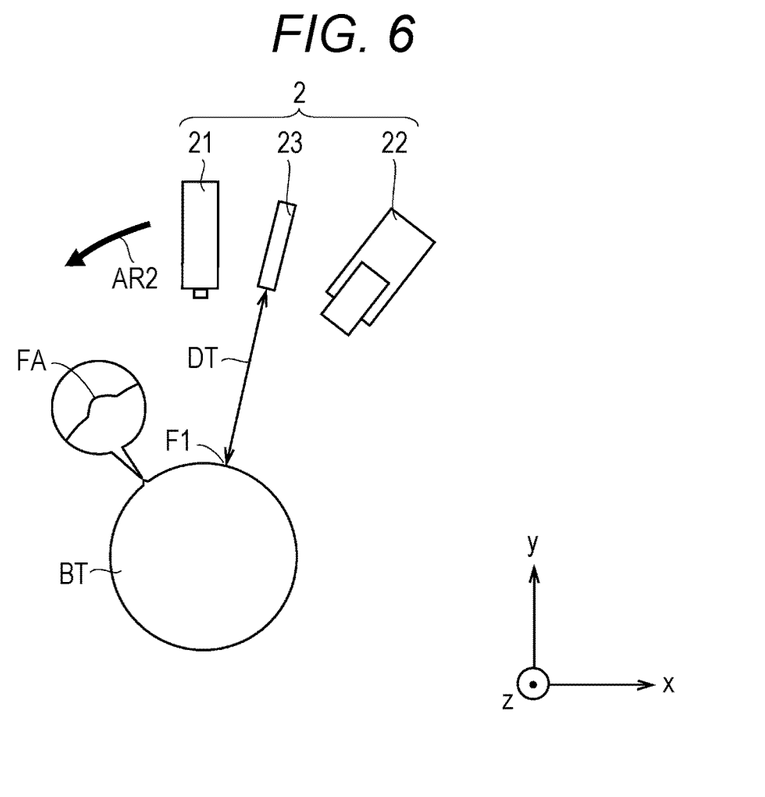
FIG. 6 is a top view for explaining a configuration and operations of a shooting part according to an embodiment of the present invention.

FIG. 6 is a top view for explaining a configuration and operations of the shooting part 2 according to an embodiment of the present invention.

With reference to FIG. 6, the shooting part 2 includes a line light source 21, an area camera 22, and a laser sensor 23 (exemplary distance measure).

The line light source 21 emits linear light (bright line) on the molded body BT.

The area camera 22 shoots the molded body BT passing through a shooting position F1 as a region on which light is emitted by the line light source 21.

The laser sensor 23 emits distance measurement light on the molded body BT and receives reflected light of the emitted light thereby to measure a distance DT between the laser sensor 23 and the surface of the molded body BT (the shooting position F1).

The distance measurement system by the laser sensor 23 may be in a triangulation system for measuring a distance to an object on the basis of a light reception position, or may be in a time measurement system for measuring a distance to an object on the basis of a time for which emitted laser light is reflected on the object and returns. When the laser sensor 23 is in a time measurement system, the laser sensor 23 may be in a phase difference distance system in which laser light amplitude-modulated at a basic frequency is emitted on an object, a time is calculated on the basis of a phase difference between the emitted light and its reflected light, and the calculated time is multiplied by a light speed thereby to measure a distance to the object.

Figure 7:
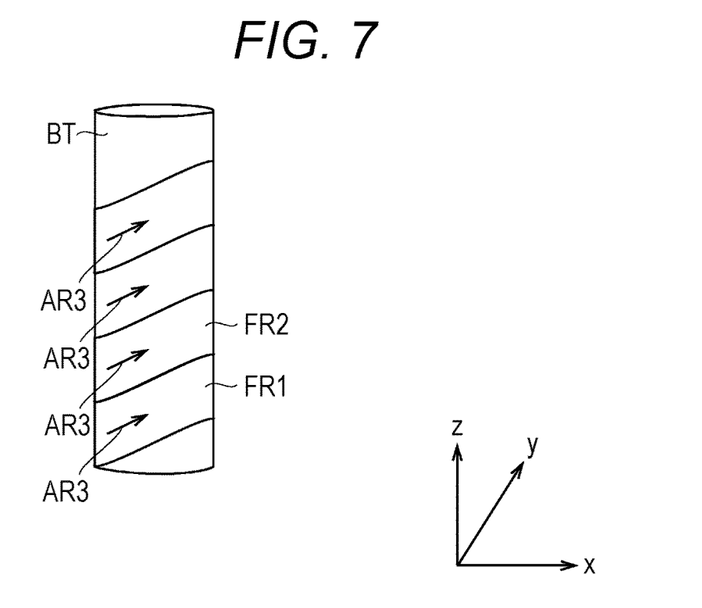
FIG. 7 is a diagram schematically illustrating a change in shooting region of the shooting part according to an embodiment of the present invention.

FIG. 7 is a diagram schematically illustrating a change in the shooting region FR of the shooting part 2 according to an embodiment of the present invention.

With reference to FIG. 2 and FIG. 7, as described above, the shooting part 2 shoots the surface of the molded body BT while rotating around the molded body BT moving in the feeding direction AR1. Thus, the shooting position F1 of the molded body BT spirally changes as indicated in an arrow AR3, and the shooting region FR also turns into a spiral shape. Thus, the feeding speed of the molded body BT and the movement speed of the shooting part 2 may be set such that the upper end of a shooting region FR1 of an image shot while the shooting part 2 is rotating one revolution around the molded body BT and the lower end of a shooting region FR2 of the image shot while the shooting part 2 is next rotating one revolution around the molded body BT are at substantially the same position. The image processing unit 103 may create a 3D image of the surface of the molded body BT by linking the images shot by the shooting part 2 at the same positions of the molded body BT in the circumferential direction.

Figure 8A:
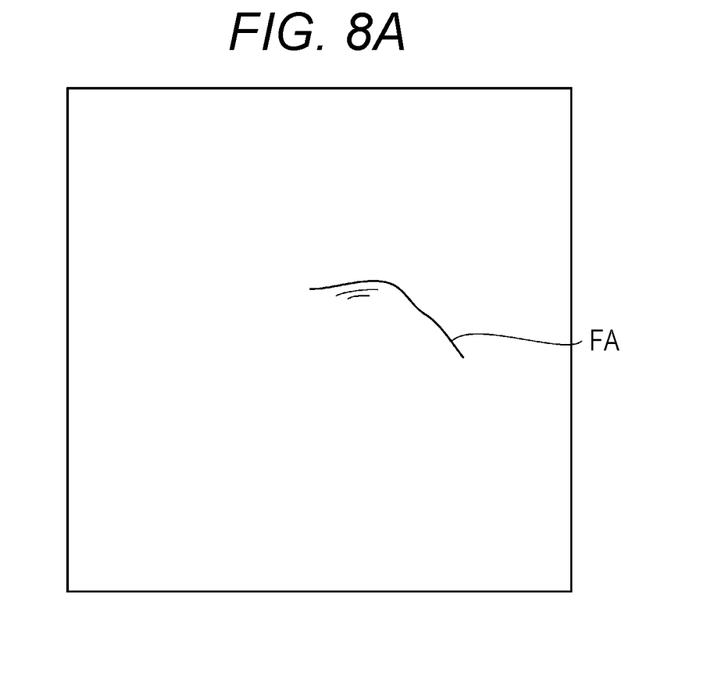
FIGS. 8A and 8B are diagrams schematically illustrating the shooting results of the shooting part according to an embodiment of the present invention.
Figure 8B:
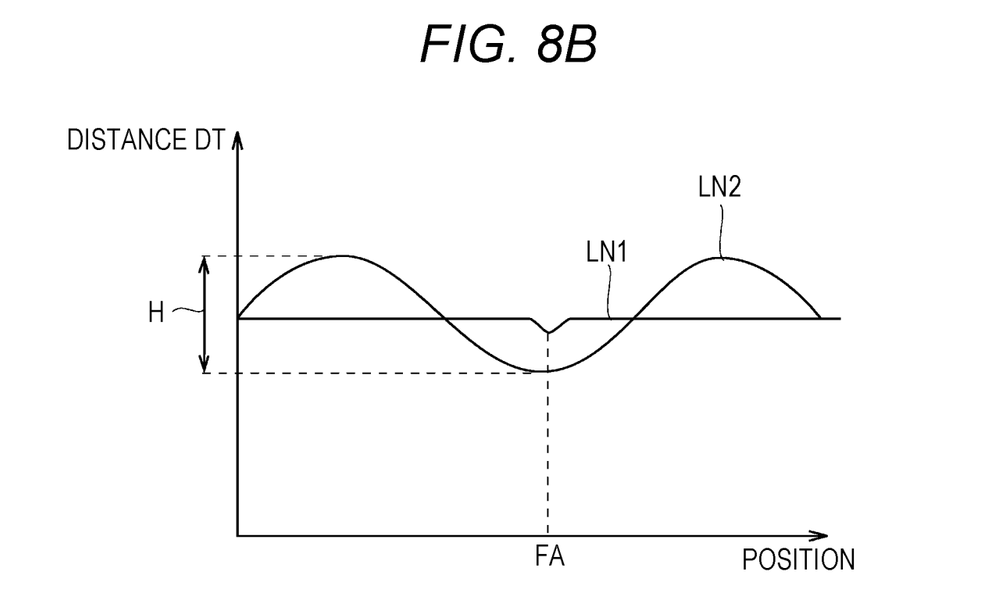

FIGS. 8A and 8B are diagrams schematically illustrating the shooting results by the shooting part 2 according to an embodiment of the present invention. FIG. 8A is a diagram schematically illustrating an image shot by the area camera 22. FIG. 8B is a diagram schematically illustrating a positional change of the molded body BT at the distance DT measured by the laser sensor 23.

With reference to FIGS. 8A and 8B, when a faulty region FA (such as local convex or concave) is present in the shooting region FR, brightness and the like are different from those in other part of the faulty region FA in the image shot by the area camera 22, as illustrated in FIG. 8A. The image processing unit 103 detects the presence of a faulty region FA in the shooting region FR by use of the differences in brightness and the like. The image processing unit 103 measures the area and height (radial length) of a faulty region FA when the faulty region FA is detected. The image processing unit 103 determines that the faulty region FA is defective when each of the measured area and height of the faulty region FA exceeds a predetermined threshold.

The image processing unit 103 may detect a defect on the basis of whether at least one of the area and the height of the faulty region FA in the image shot by the area camera 22 is higher than or equal to a threshold. The image processing unit 103 may receive the set thresholds via the operation display 101d.

In a conventional inspection step, the presence of a defect is visually inspected by comparing with an inspection reference sample of the intermediate transfer belt. A variety of inspection references are present. Thus, it is preferable that more appropriate thresholds are set by collecting the images shot by the shooting part 2 and examining the collected images. A defect may be visually detected by a user of the intermediate transfer belt manufacturing apparatus on the basis of images shot by the shooting part 2.

Further, when a faulty region FA is present in the shooting region FR, the distance DT measured by the laser sensor 23 locally varies in the faulty region FA as indicated in a line LN1 of FIG. 8B. Thus, the image processing unit 103 may detect a faulty region FA by use of the area camera 22 as described above, and may detect the presence of a faulty region FA on the basis of a variation in the distance DT measured by the laser sensor 23. In this case, the image processing unit 103 measures the area and height (radial length) of a faulty region FA when the faulty region FA is detected, and may determine that the faulty region FA is defective when each of the measured area and height of the faulty region FA exceeds a predetermined threshold.

The image processing unit 103 may detect a defect on the basis of whether at least one of the area and the height of the faulty region FA detected by the laser sensor 23 exceeds a threshold. The image processing unit 103 may receive the set thresholds via the operation display 101d.

When the center of rotation of the shooting part 2 (the center of the pedestal 4) is offset from the center of the molded body BT, the distance DT measured by the laser sensor 23 periodically varies in the circumferential direction of the molded body BT as indicated in a line LN2 of FIG. 8B. When the distance DT measured by the laser sensor 23 periodically varies and an amplitude H of the periodical variation of the distance DT is out of a predetermined range, the image processing unit 103 notifies an alarm via the operation display 101d. When notified of the alarm, the user of the intermediate transfer belt manufacturing apparatus corrects the positions of the injection molding machine 1 and the pedestal 4 such that the center of the molded body BT matches with the center of rotation of the shooting part 2 (the center of the pedestal 4).

Figure 9:
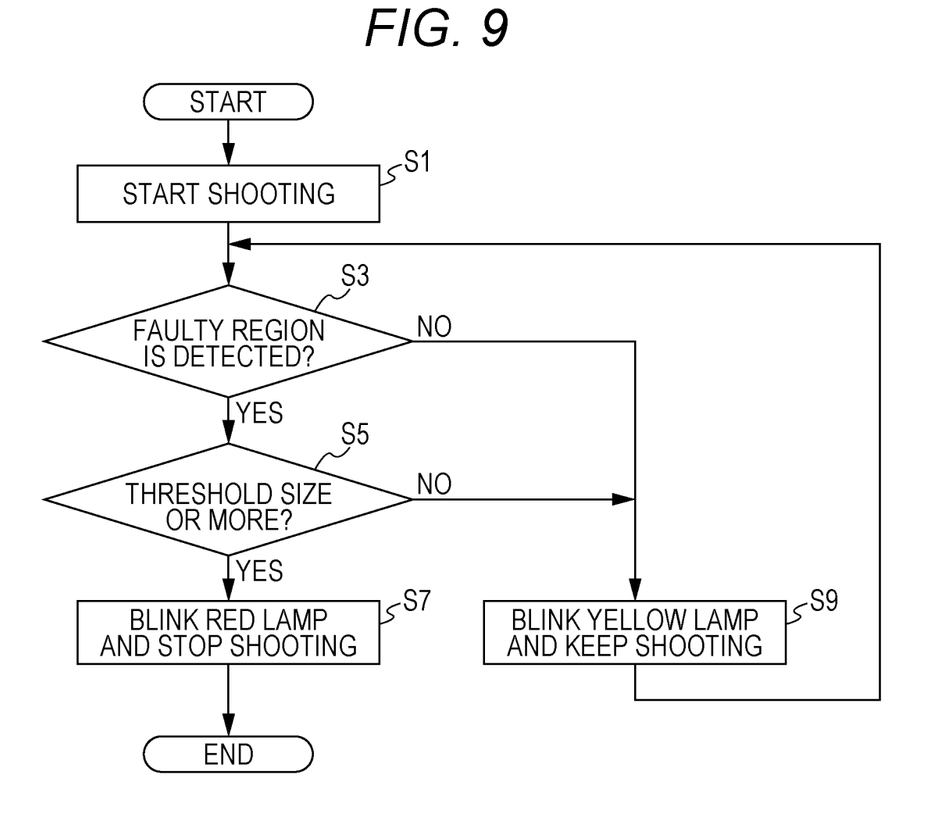
FIG. 9 is a flowchart illustrating the operations of the intermediate transfer belt manufacturing apparatus for detecting a defect according to an embodiment of the present invention.

FIG. 9 is a flowchart illustrating the operations of the intermediate transfer belt manufacturing apparatus for detecting a defect according to an embodiment of the present invention. The CPU 101a executes the control programs stored in the ROM 101b so that the operations in the flowchart are realized.

With reference to FIG. 9, the CPU 101a starts shooting the surface of the molded body BT while the injection molding machine 1 is feeding the molded body BT and the shooting part 2 is rotating (S1). The CPU 101a then determines whether a faulty region is detected (S3).

In step S3, when it is determined that a faulty region is detected (YES in S3), the CPU 101a determines whether the detected faulty region has a threshold size or more (S5).

When it is determined that a faulty region is not detected in step S3 (NO in S3), or when the detected faulty region does not have the threshold size or more in step S5 (NO in S5), the CPU 101a determines that a defect is not detected. The CPU 101a blinks a yellow lamp indicating a defect-less object on the operation display 101d, and keeps shooting (S9). The CPU 101a proceeds to the processing in step S3.

When it is determined that the detected faulty region has the threshold size or more in step S5 (YES in S5), the CPU 101a determines that a defect is detected. The CPU 101a blinks a red lamp indicating a faulty object on the operation display 101d, stops shooting (S7), and terminates the processing.

Figure 10:
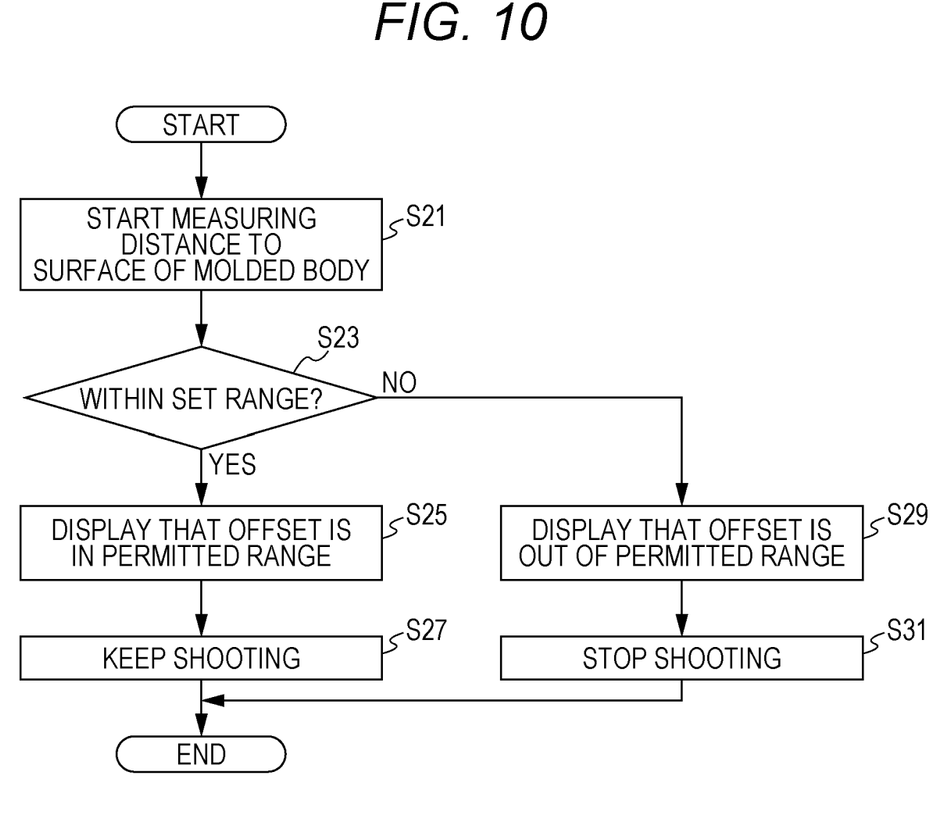
FIG. 10 is a flowchart illustrating the operations of the intermediate transfer belt manufacturing apparatus for positional alignment between a molded body and a pedestal according to an embodiment of the present invention.

FIG. 10 is a flowchart illustrating the operations of the intermediate transfer belt manufacturing apparatus for positional alignment of the molded body BT and the pedestal 4 according to an embodiment of the present invention. The CPU 101a executes the control programs stored in the ROM 101b so that the operations in the flowchart are realized.

With reference to FIG. 10, the CPU 101a starts measuring a distance to the surface of the molded body BT by use of the laser sensor 23 while the injection molding machine 1 is feeding the molded body BT and the shooting part 2 is rotating (S21). The CPU 101a then determines whether an amplitude of the periodical variation of the measured distance is within a predetermined range (S23).

In step S23, when it is determined that the amplitude of the periodical variation of the measured distance is in the predetermined range (YES in S23), the CPU 101a displays, on the operation display 101d, that the offset between the center of the molded body BT and the center of rotation of the shooting part 2 (the center of the pedestal 4) is in a permitted range (S25). The CPU 101a keeps shooting (S27), and terminates the processing.

In step S23, when it is determined that the amplitude of the periodical variation of the measured distance is out of the predetermined range (NO in S23), the CPU 101a displays, on the operation display 101d, that the offset between the center of the molded body BT and the center of rotation of the shooting part 2 (the center of the pedestal 4) is out of the permitted range, and buzzes (S29). The CPU 101a stops shooting (S31), and terminates the processing.

Effects of Embodiment

According to the above embodiment, the presence of a defect can be detected at the initial stage in the production step immediately after injection molding on the basis of shot images of the surface of a molded body. Thus, a time to detect a defect can be shorter than when a defect is detected after a molded body is cut.

Further, the shooting part 2 includes only one camera, and thus a time required to adjust the camera can be reduced and the inspection is facilitated. That is, when the shooting part 2 includes a plurality of cameras, the characteristics and shooting conditions of the respective cameras are different, and thus a time to adjust each camera before shooting is required.

[Modifications]

Figure 11:
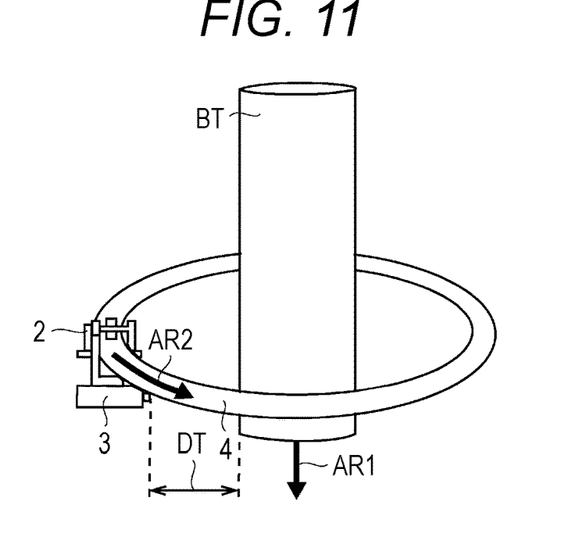
FIG. 11 is a perspective view illustrating a configuration of part of the intermediate transfer belt manufacturing apparatus according to a first modification of an embodiment of the present invention.

FIG. 11 is a perspective view illustrating a configuration of part of the intermediate transfer belt manufacturing apparatus according to a first modification of an embodiment of the present invention.

With reference to FIG. 11, the shooting part 2 is arranged below the pedestal 4 according to the present modification. The frame 31 extends below the wheels 32 to 35 and the pedestal 4, and the shooting part 2 is fixed at the lower end of the frame 31. Also with the configuration, the similar effects to the above embodiment can be obtained.

Figure 12:
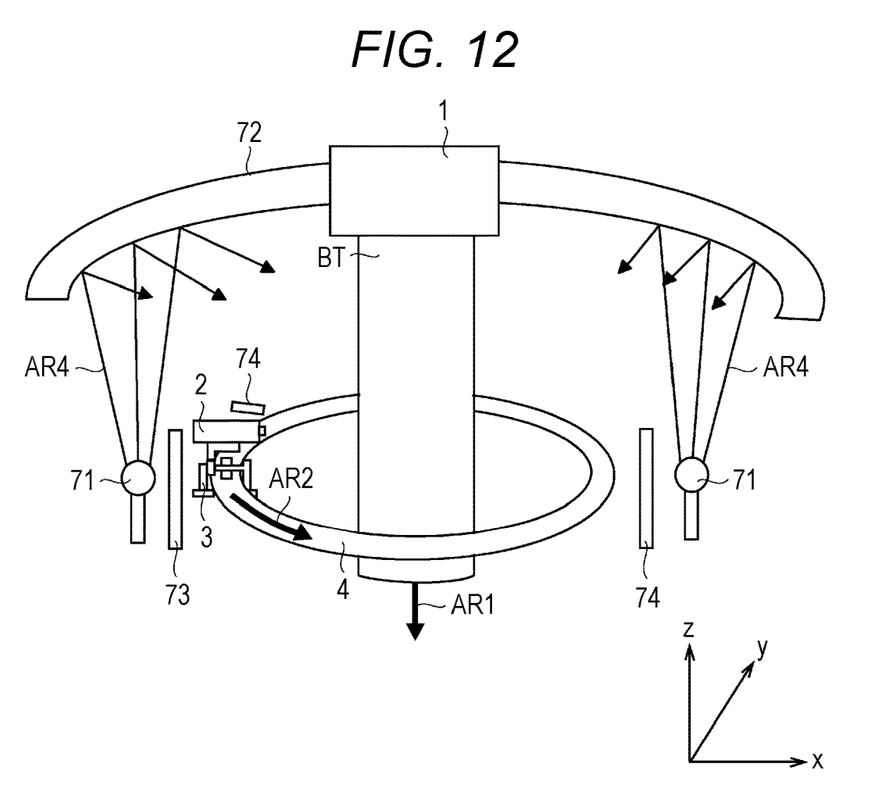
FIG. 12 is a front view illustrating a configuration of the intermediate transfer belt manufacturing apparatus according to a second modification of an embodiment of the present invention.

FIG. 12 is a front view illustrating a configuration of the intermediate transfer belt manufacturing apparatus according to a second modification of an embodiment of the present invention.

With reference to FIG. 12, the intermediate transfer belt manufacturing apparatus according to the present modification further includes illuminations 71, a diffuser 72, a partition wall 73, and an illuminance measure 74.

For example, two illuminations 71 are arranged to sandwich the molded body BT radially outside the pedestal 4. The illuminations 71 emit light upward.

The diffuser 72 is fixed on the injection molding machine 1, and extends from the injection molding machine 1 around the injection molding machine 1. The diffuser 72 reflects light from the illuminations 71 as indicated in arrows AR4, thereby diffusing the light from the illuminations 71 toward the region including the shooting region FR.

The partition wall 73 is provided between the illuminations 71 and the pedestal 4. The partition wall 73 blocks light from the illuminations 71 toward the shooting part 2, thereby preventing the light of the illuminations 71 from directly travelling into the shooting part 2.

The illuminance measure 74 measures illuminance around the area camera 22. The illuminance measure 74 is fixed on the movement part 3, and moves together with the movement part 3.

Figure 13:
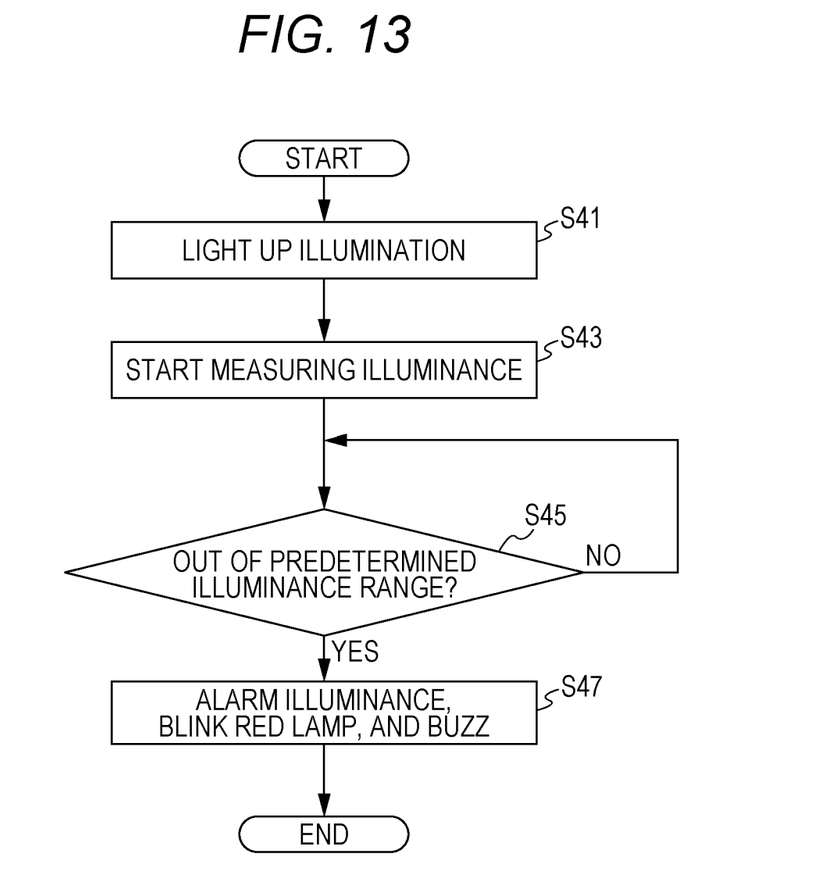
FIG. 13 is a flowchart illustrating the operations of the intermediate transfer belt manufacturing apparatus for adjusting illuminance around the shooting part according to the second modification of an embodiment of the present invention.

FIG. 13 is a flowchart illustrating the operations of the intermediate transfer belt manufacturing apparatus for adjusting illuminance around the shooting part 2 according to the second modification of an embodiment of the present invention. The CPU 101a executes the control programs stored in the ROM 101b so that the operations in the flowchart are realized.

With reference to FIG. 13, the CPU 101a lights up the illuminations 71 (S41), and starts measuring illuminance by use of the illuminance measure 74 (S43). The measured illuminance may be displayed on the operation display 101d as needed. Subsequently, the CPU 101a determines whether the measured illuminance is out of a predetermined illuminance range (S45). The CPU 101a repeatedly performs the processing in step S45 until determining that the measured illuminance is out of the predetermined illuminance range.

In step S45, when determining that the measured illuminance is out of the predetermined illuminance range (YES in S45), the CPU 101a blinks a red lamp indicating abnormal illuminance on the operation display 101d, and buzzes, thereby notifying an illuminance alarm (S47) and terminating the processing.

According to the present modification, the light of the illuminations 71 are indirectly emitted on the shooting part 2, and thus an effect of environment light (disturbance light) influencing an image shot by the shooting part 2 can be reduced. Further, illuminance around the area camera 22 is measured by the illuminance measure 74, and thus a state of light from the illuminations 71 can be monitored.

Figure 14:
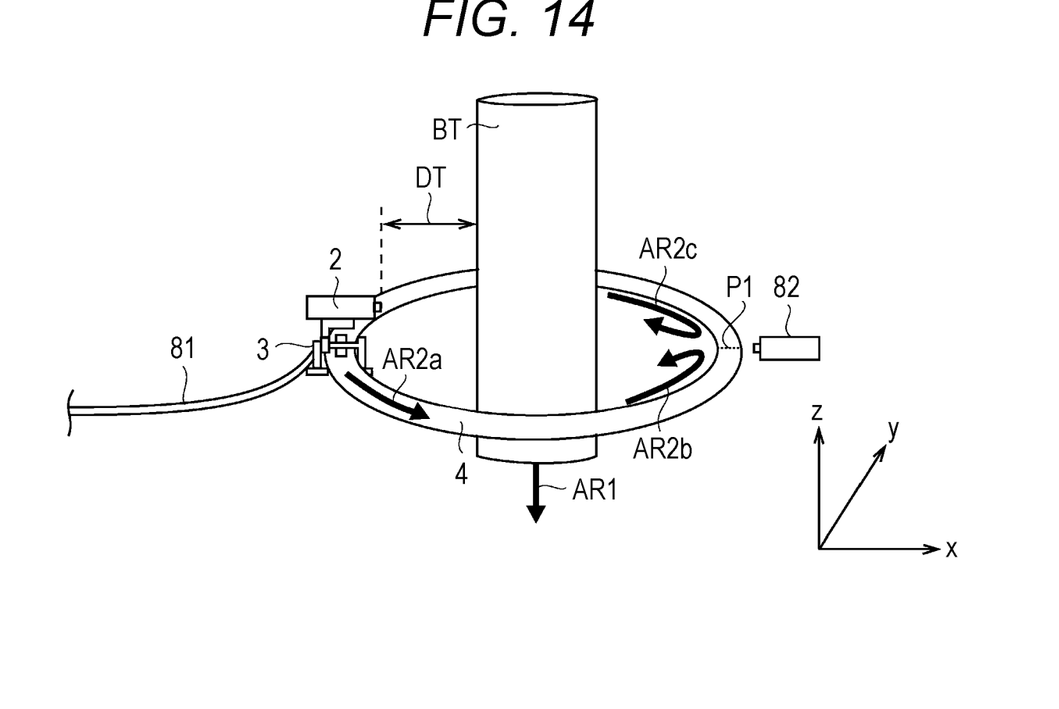
FIG. 14 is a perspective view illustrating a configuration of part of the intermediate transfer belt manufacturing apparatus according to a third modification of an embodiment of the present invention.

FIG. 14 is a perspective view illustrating a configuration of part of the intermediate transfer belt manufacturing apparatus according to a third modification of an embodiment of the present invention.

With reference to FIG. 14, the intermediate transfer belt manufacturing apparatus according to the present modification further includes a communication cable 81 and a sensor 82. The communication cable 81 is connected to the shooting part 2 and the movement part 3, and is used to transmit image data shot by the area camera 22 or to supply power from a power supply to the shooting part 2 and the movement part 3. When the shooting part 2 and the movement part 3 keep rotating around the molded body BT in one direction, the communication cable 81 can interfere with the molded body BT.

Thus, the movement part controller 104 according to the present modification starts moving the shooting part 2 and the movement part 3 from the initial position as indicated in an arrow AR2a, and reversely rotates the shooting part 2 and the movement part 3 as indicated in an arrow AR2b when the shooting part 2 and the movement part 3 reach a position P1 (exemplary predetermined reverse position) on the pedestal 4. When the shooting part 2 and the movement part 3 rotate one revolution around the molded body BT and reach the position P1 again, the movement part controller 104 then reversely rotates the shooting part 2 and the movement part 3 as indicated in an arrow AR2c. Thereafter, the movement part controller 104 reverses the moving direction of the shooting part 2 and the movement part 3 whenever the shooting part 2 and the movement part 3 reach the position P1.

The sensor 82 detects the shooting part 2 and the movement part 3 at the position P1. The movement part controller 104 reverses the travelling direction of the shooting part 2 and the movement part 3 on the basis of a detection result of the sensor 82.

Figure 15:
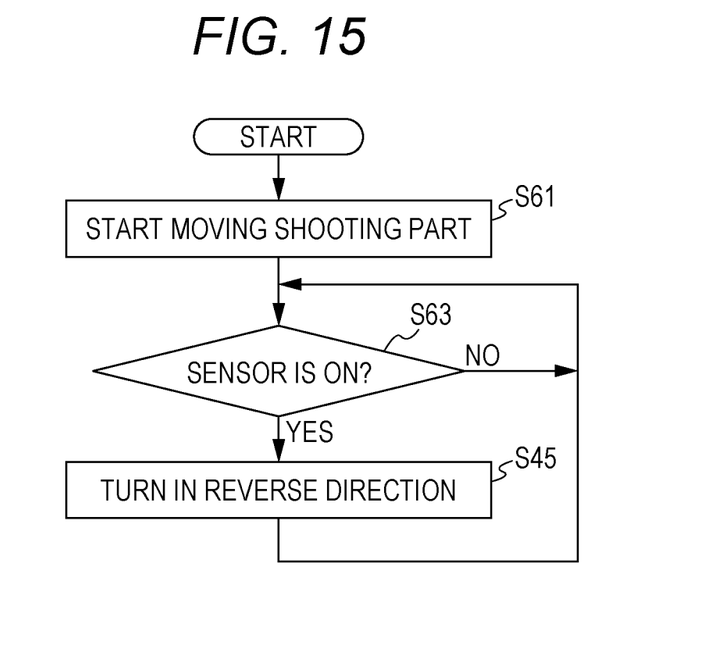
FIG. 15 is a flowchart illustrating the operations of the intermediate transfer belt manufacturing apparatus for movement of the shooting part and the movement part according to the third modification of an embodiment of the present invention.

FIG. 15 is a flowchart illustrating the operations of the intermediate transfer belt manufacturing apparatus for movement of the shooting part 2 and the movement part 3 according to the third modification of an embodiment of the present invention. The CPU 101a executes the control programs stored in the ROM 101b so that the operations in the flowchart are realized.

With reference to FIG. 15, when starting moving the shooting part 2 and the movement part 3 (S61), the CPU 101a determines whether the sensor 82 detects the shooting part 2 and the movement part 3 (S63). The CPU 101a repeatedly performs the processing in step S63 until determining that the sensor 82 detects the shooting part 2 and the movement part 3.

In step S63, when determining that the sensor 82 detects the shooting part 2 and the movement part 3 (YES in S63), the CPU 101a reversely rotates the shooting part 2 and the movement part 3 (S65), and proceeds to the processing in step S63.

According to the present modification, it is possible to avoid an interference between the communication cable 81 and the molded body BT due to movement of the shooting part 2 and the movement part 3, and to easily secure a space for the communication cable.

Figure 16:
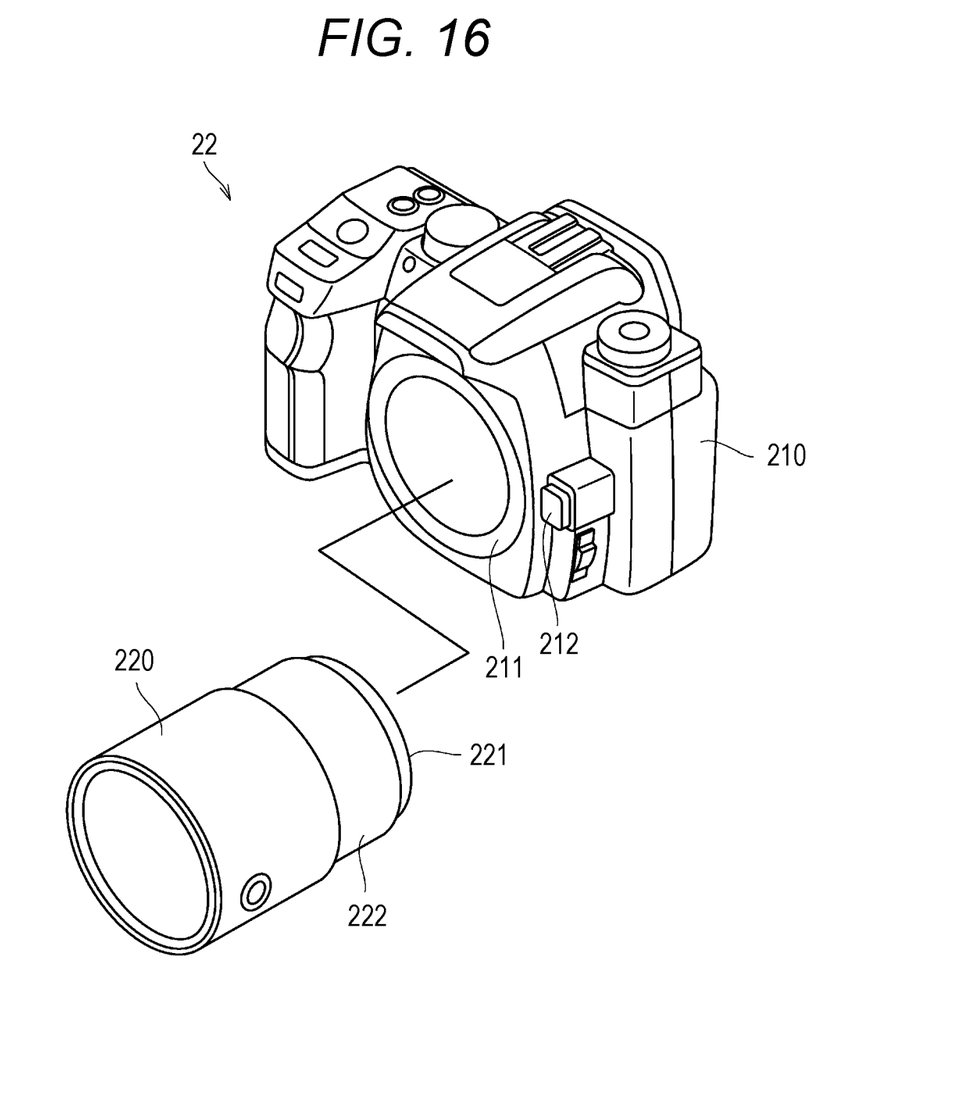
FIG. 16 is an exploded perspective view illustrating a configuration of an area camera according to a fourth modification of an embodiment of the present invention.

FIG. 16 is an exploded perspective view illustrating a configuration of the area camera 22 according to a fourth modification of the present invention.

With reference to FIG. 16, the area camera 22 according to the present modification includes a camera body 210 and a screw-in detachable lens 220. The system for attaching/detaching the lens 220 to/from the camera body 210 is a bayonet mount system as a conventional standard lens mount mechanism. That is, when the lens 220 is mounted on the camera body 210, a fixed roll 222 is rotated while a lens mount face 221 is in contact with a camera body mount face 211. When the lens 220 is detached from the camera body 210, the reverse operation to the above operation is performed. A lock mechanism (not illustrated) for keeping the lens 220 mounted is provided on each of the camera body 210 and the lens 220. The camera body 210 is further provided with a lens removal button 212 for unlocking.

Intermediate transfer belts having various diameters are generally manufactured by the intermediate transfer belt manufacturing apparatus. When a small-diameter intermediate transfer belt is manufactured, the diameter of the molded body BT is also smaller, and the distance from the area camera 22 to the surface of the molded body BT is longer. On the other hand, when a large-diameter intermediate transfer belt is manufactured, the diameter of the molded body BT is also larger, and the distance from the area camera 22 to the surface of the molded body BT is shorter. According to the present modification, the lens 220 is selected depending on the distance from the area camera 22 to the surface of the molded body BT or a required size of the shooting region FR, and is mounted on the camera body 210, thereby facilitating the surface of the molded body BT to be shot at an optimum magnification.

Configurations and operations other than the above ones of the intermediate transfer belt manufacturing apparatus according to each modification are similar to the configuration and operations of the intermediate transfer belt manufacturing apparatus according to the above embodiment, and thus the description thereof will be omitted.

OTHERS

The above embodiment and modifications can be combined with each other.

The processing according to the above embodiment and modifications may be performed in software or in hardware. Programs for performing the processing according to the above embodiment can be provided, and the programs may be recorded in a recording medium such as CD-ROM, flexible disc, hard disc, ROM, RAM, or memory card and provided to a user. The programs can be executed by a computer such as CPU. Further, the programs may be downloaded into an apparatus via a communication line such as Internet.

Although embodiments and modifications of the present invention have been described and illustrated in detail, the disclosed embodiments are made for purposes of illustration and example only and not limitation. The scope of the present invention should be interpreted by terms of the appended claims. The scope of the present invention is intended to include all modifications within the same meaning and range as those of equivalents of the appended claims.

What is claimed is:
1. A roll object inspection apparatus comprising:
a shooting part that shoots a surface of a roll molded body which is the uncut roll object and is injection-molded and then continuously fed in a predetermined feeding direction;
an annular pedestal that surrounds an outer periphery of the molded body; and
a movement part that moves along the pedestal and is fixed with the shooting part,
wherein the movement part includes:
a first wheel that travels on an inner diameter side and on an outer diameter side of the pedestal;
a second wheel that travels on a top of the pedestal; and
a frame that rotatably supports each of the first wheel and the second wheel.

2. The roll object inspection apparatus according to claim 1,
wherein the feeding direction is downward, and
the shooting part and the movement part move in a plane orthogonal to the feeding direction.

3. The roll object inspection apparatus according to claim 1,
wherein the shooting part is arranged above the pedestal.

4. The roll object inspection apparatus according to claim 1,
wherein the shooting part is arranged below the pedestal.

5. The roll object inspection apparatus according to claim 1, further comprising:
an image processor that links images shot by the shooting part at the same positions on the molded body in a circumferential direction.

6. The roll object inspection apparatus according to claim 1,
wherein the movement part reverses a moving direction at a predetermined reverse position of the pedestal.

7. The roll object inspection apparatus according to claim 1,
wherein the shooting part includes:
a line light source that emits linear light on the molded body; and
an area camera that shoots the molded body passing through a region on which light is emitted by the line light source.

8. The roll object inspection apparatus according to claim 7,
wherein the shooting part further includes a distance measure that emits distance measurement light on the molded body and receives reflected light of the emitted light thereby to measure a distance to the surface of the molded body.

9. The roll object inspection apparatus according to claim 8, further comprising:
a first alarm that notifies an alarm when the distance measured by the distance measure periodically varies in a circumferential direction of the molded body and an amplitude of a periodical variation of the distance measured by the distance measure is a predetermined threshold or more.

10. The roll object inspection apparatus according to claim 7, further comprising:
an illumination; and
a diffuser that reflects light from the illumination thereby to diffuse the light from the illumination into a region including a position to be shot by the shooting part.

11. The roll object inspection apparatus according to claim 7, further comprising:
an illuminance measure that measures illuminance around the area camera; and
a second alarm that notifies an alarm when the illuminance measured by the illuminance measure is out of a predetermined illuminance range.

12. The roll object inspection apparatus according to claim 7, further comprising:

a defect detector that detects a defect of the molded body on the basis of whether at least one of an area and a height of a faulty region shot by the area camera is a threshold or more.

13. The roll object inspection apparatus according to claim 12, further comprising:
a detection result notifier that notifies a defect detection result by the defect detector,
wherein when a defect is detected by the defect detector, the shooting part stops shooting.

14. The roll object inspection apparatus according to claim 7,
wherein the area camera includes a detachable lens.

15. The roll object inspection apparatus according to claim 1, further comprising:
a determiner that determines the presence of a defect on the surface of the molded body on the basis of images shot by the shooting part.

16. The roll object inspection apparatus according to claim 1,
wherein the roll object is an intermediate transfer belt.

* * * * *